No. 45,315.  
PATENTED DEC. 6, 1864.

W. S. CARR.
URINAL.

Witnesses.  
Lemuel W. Serrell  
Chas. H. Smith

Inventor.  
William S. Carr.

UNITED STATES PATENT OFFICE.

WILLIAM S. CARR, OF NEW YORK, N. Y.

IMPROVEMENT IN URINALS.

Specification forming part of Letters Patent No. 45,315, dated December 6, 1864.

*To all whom it may concern:*

Be it known that I, WILLIAM S. CARR, of the city and State of New York, have invented, made, and applied to use a certain new and useful Improvement in Urinals; and I do hereby declare the following to be a full, clear, and exact description of the said invention, reference being had to the annexed drawings, making part of this specification, wherein—

Figure 1:
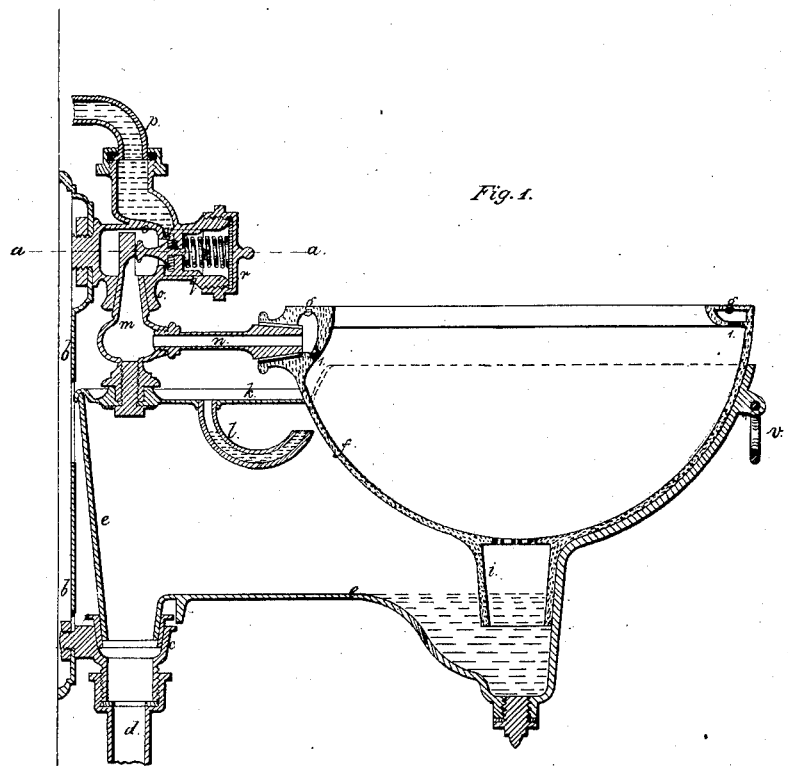
Figure 2:
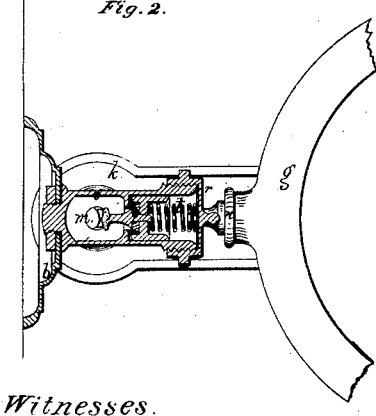

Figure 1 is a vertical section of my improved urinal, and Fig. 2 is a sectional plan at the line *a a*.

Similar marks of reference denote the same parts.

Urinals have heretofore been fitted up in closets and beneath wash-basins so as to swing around when turned from beneath such basin or closet.

My invention relates to an improvement in urinals or basins whereby the act of swinging the said urinal around shall cause the water to flow while the basin is in use, or shut off such water when the basin is pressed back out of the way after use, and I provide means for preventing the escape of smell from the pipe running away to the sewer or cess pool, and also for catching and passing into such waste-pipe any leakage that there may be at the joints that move as the basin swings.

In the drawings, *b* is a metallic plate, screwed or otherwise secured to the wall, closet, or supports for the urinal.

*c* is a ground-coupling at the upper end of the waste-pipe *d*, receiving the lower part of the metal trap and basin-holder *e*, and at which point the basin swings. This trap *e* is usually to be made of cast-iron, and may be enameled in the inside to prevent rust.

*f* is the basin or urinal, formed in any desired shape and provided with a hollow rim, *g*, through which water is allowed to pass, (as hereinafter shown,) and escapes through holes 1 1 into the basin, for washing out said basin and keeping it clean. The lower part of the basin *f* is extended downward in a pipe-shape, as at *i*, a sufficient distance to pass into water that remains in a receptacle or trap at the outer or swinging end of *e*. By this construction smell is prevented from coming out of the trap, and the ordinary bent or S-shaped trap-pipes are dispensed with. This construction of trap formed by the portion *i* entering the water might be employed with the basins of hopper water-closets as well as in urinals. The basin *f* is to be cemented tightly to the trap, near the upper edge of said trap, and a cover, *k*, is provided for that portion of the trap that extends off from the side of the basin. The edge of this cover *k* is formed with a rib, so that any water that may leak from the pipes and couplings that are above said cover *k* will be caught and passed into the trap through the pipe *l*, that is bent so as to retain sufficient water in said pipe to act as a trap to exclude smell.

*m* is a hollow plug attached on *k* and having a pipe, *n*, extending to the sockets and hollow rim of the basin *f*, and this plug *m* passes into a hollow stationary socket, *o*, attached to *b* and formed with a coupling screw receiving the pipe *p*, connecting with the supply of water. At one side of the socket *o* is a small cylinder, *q*, with a screw-cover, *r*, fitted water-tight, and this cylinder contains, loosely, a valve, *s*, that is pressed to its seat by the spring *t* and has a projecting end extending toward the upper end of the plug *m*, at which point said plug *m* is formed as a cam or eccentric.

The operation is as follows: When the basin *e* is in the usual position, the valve *s* is closed, and water cannot pass from the pipe *p* to the basin; but when the basin is swung out for use, the plug *m*, turning in *o* by its cam-shaped end, presses back the valve and allows the water to run into the basin, and on the reverse movement the water is again shut off by the valve *s* closing upon its seat.

A ring may be provided at *v* to be used in moving the basin.

What I claim, and desire to secure by Letters Patent, is—

1. The combination, with a basin or water-closet hopper, of the pipe *i*, extending below the surface of water in a receptacle below said basin or hopper, as and for the purposes specified.

2. The valve *s*, actuated by the cam-shaped end of the plug *m*, that is moved by swinging the urinal or basin, as set forth.

3. The cover *k*, with raised edges, in combination with the pipe *l*, for the purposes and as specified.

In witness whereof I have hereunto set my signature this 17th day of October, 1864.

WILLIAM S. CARR.

Witnesses:
LEMUEL W. SERRELL,
CHAS. H. SMITH.